United States Patent [19]
Kanou et al.

[11] Patent Number: 5,269,985
[45] Date of Patent: Dec. 14, 1993

[54] METHOD FOR CONTROLLING INJECTING AND MOLD CLAMPING IN A BLOW MOLDING MACHINE IN ACCORDANCE WITH A DETECTION OF A LOWER END OF A SAGGING PARISON

[75] Inventors: Yoshiaki Kanou; Hiroaki Furuya, both of Ube; Tadaaki Higuchi, Tokyo, all of Japan

[73] Assignee: Ube Industries, Ltd., Ube, Japan

[21] Appl. No.: 875,300

[22] Filed: Apr. 29, 1992

[30] Foreign Application Priority Data

Apr. 30, 1991 [JP] Japan .................................. 3-191326

[51] Int. Cl.$^5$ ........................ B29C 49/04; B29C 49/78
[52] U.S. Cl. ................... 264/40.5; 264/40.1; 264/40.7; 264/540; 425/140; 425/150; 425/532
[58] Field of Search ................... 264/40.1, 40.5, 40.7, 264/540, 541; 425/140, 150, 532

[56] References Cited

U.S. PATENT DOCUMENTS

| | | | |
|---|---|---|---|
| 3,795,719 | 3/1974 | Morecroft et al. | 264/541 |
| 3,970,418 | 7/1976 | Turek . | |
| 4,094,620 | 6/1978 | Daubenbüchel et al. | 425/140 |
| 4,444,702 | 4/1984 | Thomas et al. | 264/541 |

FOREIGN PATENT DOCUMENTS

| | | |
|---|---|---|
| 2940904 | 4/1981 | Fed. Rep. of Germany ...... 264/540 |
| 3639272 | 5/1988 | Fed. Rep. of Germany . |
| 2-57317 | 2/1990 | Japan . |
| 2220607 | 1/1990 | United Kingdom . |

OTHER PUBLICATIONS

Patent Abstracts of Japan, vol. 8, No. 124 (M-301) (1561) Jun. 9, 1984 (corres. to JP-A-59 029 131 (Kao Sekken K.K.) Feb. 1984).
Patent Abstracts of Japan, vol. 4, No. 111 (M-25) (593) Aug. 9, 1980 (corres. to JP-A-55 069 422 (Ishikawajima Harima Jukogyo) May 26, 1980).
"Regelung der Vorformlinglange beim Extrusionblasformen", 279 Kunststoffberater, No. 10, Oct. 28, 1983, pp. 48-50.
"Regelsystem fur die Vorformlinglange", 4020 Plastverarbeiter, vol. 38, No. 11, Nov. 1987, pp. 70-80.

Primary Examiner—Jan H. Silbaugh
Assistant Examiner—Catherine Timm
Attorney, Agent, or Firm—Finnegan, Henderson, Farabow, Garrett & Dunner

[57] ABSTRACT

A method and apparatus for injecting and mold clamping control of an injection blow molding machine, wherein a parison injected downward from a die between mold halves defining a cavity is detected to thereby determine the dynamic locus of its free end. In every run the mold clamping is commanded to start before the end of injection is commanded and is effected according to the clamping operational conditions determined based on the parison locus determined in the instant or preceding run. In one method a clamping starting time is determined by a calculation with a predetermined clamping stroke speed. In another alternative method an initial clamping stroke speed is determined by a calculation with a predetermined clamping starting time and following stroke speed. In the alternative methods the end of injection is commanded at the time, predicted by a calculation, when the free parison end reaches a predetermined vertical position down from the end of the cavity where the inner horizontal end of each mold half is spaced a predetermined horizontal distance from the outer face of the parison. The mold clamping is switched from the initial stroke speed to the following speed at the predicted time.

8 Claims, 4 Drawing Sheets

METHOD FOR CONTROLLING INJECTING AND MOLD CLAMPING IN A BLOW MOLDING MACHINE IN ACCORDANCE WITH A DETECTION OF A LOWER END OF A SAGGING PARISON

BACKGROUND OF THE INVENTION

1. Field of the Invention

The present invention relates to an improved method and apparatus for an injecting and mold clamping control of a blow molding machine, and in particular, relates to a control method and apparatus for use in producing blow molded hollow articles of plastic materials such as engineering plastics, using an injection machine.

2. Description of the Related Art

A blow molding process is a well known method of producing hollow plastic articles, and according to a prior art, a blow molding machine comprises an injection machine part, called an "injection machine", but having a die defining a downwardly extending annular melt passage, preferably in a combination with a pre-blowing means.

The injection machine part is provided for plasticizing a plastic material and injecting the plasticized material into the atmosphere through the die, to thereby produce a hollow parison of the material ejected and sagging from the die. Preferably the ejected parison is subjected to a pre-blowing of air into the parison.

The blow molding machine further comprises a mold machine part comprising a pair of mold halves having parting faces and forming the mold. The mold halves define a mold cavity when the mold is closed. The mold machine part further comprises an air blowing means and a mold clamping device which is actuated to move the mold halves toward each other, to thereby clamp the mold while the parison is between the mold halves. The parison is subjected to the mold clamping while air is blown into a main portion of the parison enclosed by the cavity, to thereby expand the parison and urge same against the cavity, while the mold is cooled, to thereby produce a molded article formed by the parison in the cavity. The parison is separated from the die after the mold clamping, and before the next run begins, and thus the mold receives a fresh parison having a lower free end at every run.

In this type of blow molding machine, when the parison ejected and sagging from the die is gripped between the mold halves, the longer distance by which the free parison end protrudes out of the mold, the greater the amount of burrs produced, whereby the production yield is deteriorated. Conversely, if the mold halves are clamped before the free parison end has sufficiently sagged downward, a defective article is produced. Therefore, in the past, the practice has been to perform an adjustment such that, when the mold clamping is completed, the free parison end does not protrude too far outside the mold, i.e., only to an extent such that a suitable amount of burrs is produced.

Figure 4:
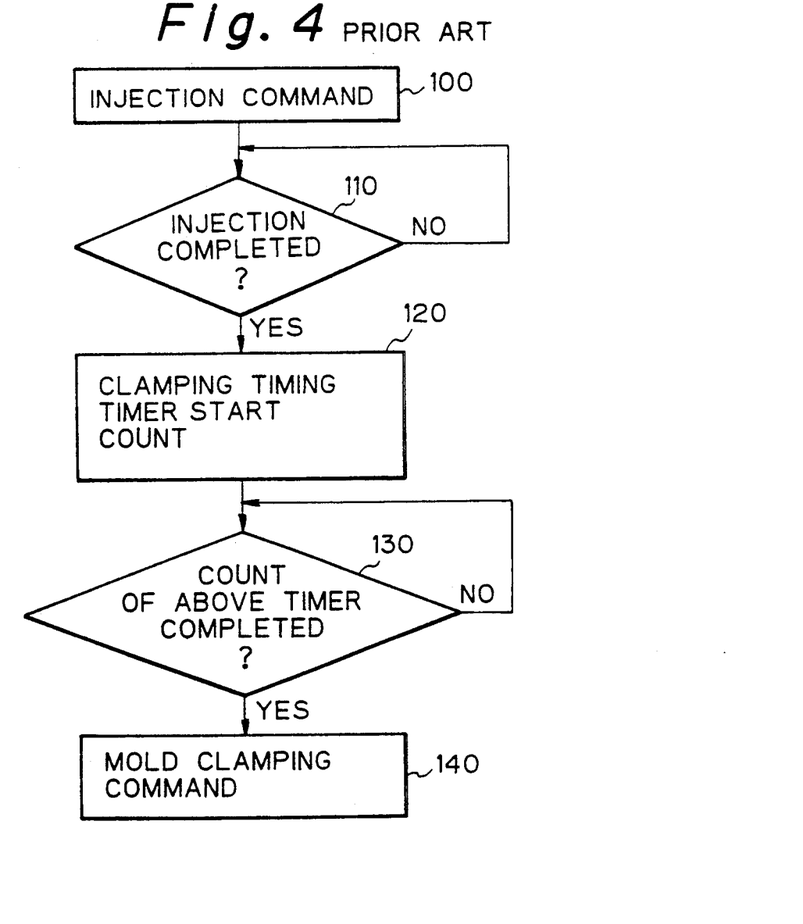
FIG. 4 is a flow chart showing a method of an injecting and mold clamping control according to a prior art.

The most general method used in the past for setting the mold clamping timing was, as shown in FIG. 4, to start the mold clamping after the end of the injection. The injection or ejection was ended after the output of an injection command (step 100). The end is confirmed by detecting the position of the plunger, etc., of the injection machine part (step 110). A previously set clamping timer was started to count the time (step 120), it was determined if the count had reached a predetermined value (step 130), and a clamping starting command was output (step 140). Usually, the timing timer was set to "0", and thus the mold clamping was started immediately after the end of the injection.

As another method, the injection and mold clamping were actuated in parallel. In this method, the clamping timing timer was started simultaneously with the injection command, and the mold clamping was started upon detecting that the count of the timer had reached a preset value (several seconds shorter than the 10 to 20 seconds injection time).

In the above-mentioned conventional method, however, in any case use was made of a timer which counted based on an input of the ejection signal of the parison or the injection signal of the plasticized material, and as the mold clamping was started when the time ran out, the following problems arose:

That is, recently a greater use has been made of engineering plastics, due to their expanded applications. In this case, in general, the speed of sag of the parison ejected from the die is high, and further, the solidifying speed is high, and thus a high speed injection is performed.

With a high speed injection, however, there is a large error in the position of the parison after a certain amount of time has elapsed from the start of the injection. If starting the mold clamping by the count of timer from the start of injection, in many cases the timing becomes off, and as a result, the mold is clamped too fast with respect to the position of the free parison end or conversely is clamped too slow, so there was a problem in that a satisfactory molding was not possible. That is, in the conventional method, the system counted the clamping timing by a timer after either the start of injection or the end of injection. The injection end occurs when the plunger of the injecting machine part is stopped to advance upon the free parison end reaching a position a predetermined vertical distance away from the lower end of the mold cavity toward the lower end of the mold. In this connection, if the injection speed was high or if use was made of an engineering plastic or other resin which easily sags downward, and the speed of sag of the parison was high, then by just clamping the mold according to the count of the timer without regard to the actual parison position or state, it was not possible to clamp the mold accurately in accordance with the parison position. This caused an excessive production of burrs or defective blow moldings due to an insufficient charging. Further, the timing of the start of the mold clamping was difficult to determine, so the cycle time of the blow molding per se became longer.

On the other hand, in a parison ejected and sagging from the die, there is a draw down phenomenon due to the weight of the parison itself. Further, the larger this draw down became, the larger the shape of the article, and this becomes even greater as the parison moves downward. Due to this, very complicated work was required for setting the timer. In actuality, it was necessary to set the mold clamping and injecting timings by trial and error after many attempts.

SUMMARY OF THE INVENTION

An object of the present invention is to provide a method and apparatus for an injecting and mold clamping control of a blow molding machine, improved in that it is possible to eliminate the complicated preparatory work, reduce the cycle time or duration of a run, increase the product yield, and perform an excellent blow molding by effecting the end of injection when the parison precisely reaches a suitable position and then the mold clamping is completed without having to reset the clamping and injecting timings by trial and error after many attempts each time different products are molded, due to differences in resin materials and changed molds.

According to the present invention, there is provided an improved method of an injecting and mold clamping control of a conventional blow molding machine comprising an injection machine part with a die for plasticizing a plastic material and injecting the plasticized material through the die to thereby produce a hollow parison of the material ejected from the die and sagging downward, and a mold machine part for blow molding the parison with air to thereby produce a hollow article defined by a mold cavity. The mold machine part comprises a pair of mold halves having parting faces and defining the mold cavity when the mold is closed, an air blowing means for blowing air into the parison when the mold is clamped with the parison between the mold halves, and a mold clamping device for moving the mold halves toward each other to thereby complete the mold clamping.

The control method is characterized in that the parison is detected to thereby determine the dynamic locus of its lower free end, represented by a function of position and time, and in every run of an injection blow molding the mold clamping is commanded to start before the end of the injection is commanded, and the mold clamping is effected in accordance with the clamping operational conditions determined based on the parison locus determined in the instant or preceding run.

In particular, the control method of the present invention comprises the steps of: after the start of injection, detecting the lower free end of the parison at a plurality of spaced positions, preferably three positions $(I_a, I_b, I_c)$, in the vertical direction in the path of the sag of the parison, to thereby obtain the position and time information $(I_a, I_b, I_c, t_a, t_b, t_c)$ on the parison relative to the die and the mold; predicting or determining the time $(t_1)$, counted from the injection start, when the free parison end will reach a parison position $(I_{100})$ a predetermined vertical distance away from the lower end of the cavity toward the lower end of the mold, and the other necessary operational conditions, by a calculation based on the detected position and time information and the other predetermined information; commanding the end of injection at the predicted time $(t_1)$; and during the injection, actuating the mold clamping device to move the mold halves toward each other in the horizontal direction to thereby clamp the mold with the parison between the mold halves, so that each inner horizontal end of the mold halves will approach a mold position $(St_1)$ a predetermined horizontal distance $(L_h)$ down from the outer face of the parison at the predicted time $(t_1)$.

Preferably, the predetermined parison position $(I_{100})$ is set to the lower end of the mold, and the predetermined mold position $(St_1)$ is set to a horizontal distance $(L_h)$ of at least 10 mm away from the outer face of the parison.

Further, among the two or more parison positions $(I_a, I_b, I_c, \ldots)$, preferably at least three positions are set between the upper end and a position above the lower end of the mold cavity.

For the calculation of the necessary operational conditions in the predicting step, an average diameter $(\overline{D})$ or width of the parison when the free parison end reaches the predetermined parison position $(I_{100})$, preferably the lower end of the mold, is determined by measuring in advance, and is used as a data involved in the predetermined information.

With respect to the predicting and mold clamping steps, two alternative methods may be used, as follow:

In the predicting step, a clamping starting time $(t_3)$ counted from the injection start is determined by a calculation based on the detected position and time information $(I_a, I_b, I_c, t_a, t_b, t_c)$ on the parison, predetermined opened and closed positions of the mold $(S_0, S_{100})$ represented by corresponding strokes of each mold half, a predetermined clamping stroke speed $(v_2)$ of each mold half, and other predetermined information. In the mold clamping step, the mold clamping device is actuated from the calculated clamping starting time $(t_3)$ to effect the mold clamping from the predetermined opened position $(S_0)$ of the mold at a predetermined clamping stroke speed $(v_2)$, preferably the maximum speed, constant over the substantially entire clamping stroke of each mold half or constant over a time until a time immediately before the mold halves abut against each other at their parting faces via the parison.

Alternatively, in the predicting step, an initial clamping stroke speed $(v_1)$ of each mold half is determined by a calculation based on the detected position and time information $(I_a, I_b, I_c, t_a, t_b, t_c)$ on the parison, predetermined opened and closed positions $(S_0, S_{100})$ of the mold represented by corresponding strokes of each mold half, a predetermined clamping starting time $(t_2)$, a predetermined following stroke speed $(v_2)$, preferably the maximum speed, of each mold half higher than the initial stroke speed $(v_1)$, and other predetermined information. In the mold clamping step, the mold clamping device is actuated from the predetermined clamping starting time $(t_2)$ counted from the injection start to effect the mold clamping at the calculated initial stroke speed $(v_1)$ from the predetermined opened position $(S_0)$ of the mold over a time until the predicted time $(t_1)$ and then at the predetermined clamping stroke speed $(v_2)$ over a following time until a time immediately before the mold halves abut against each other at their parting faces via the parison.

The above-mentioned other predetermined information to be adopted in the calculation involves the average diameter $(\overline{D})$ of the parison as mentioned above, and the predetermined mold position $(St_1)$ and the predetermined horizontal gap between the parison and each mold half, i.e., the predetermined horizontal distance $(L_h)$ between the inner horizontal end of each mold half and the outer face of the parison.

At the final stage of the mold clamping, the clamping stroke speed is considerably reduced from the predetermined stroke speed $(v_2)$ immediately before the mold halves abut against each other at their parting faces via the parison, to prevent the mold halves being damaged due to an impingement against each other.

An injection ending command is made at the predicted time $(t_1)$, but the parison ejection from the die is not completely stopped at the same time and is forced to continue to some extent due to the hydraulic operational delay occurring in the injection machine part, the inertias of the plasticized material and the draw down phenomenon, etc. In this connection, a vertical length ($I_y$) of the parison at the time the mold clamping is completed is a little longer than that ($I_{100}$) at the predicted time ($t_1$). Therefore, where the free parison end reaches the lower end of the mold at the predicted time ($t_1$), it projects to some extent out of the lower end of the mold when the mold clamping is completed.

According to the present invention, there is also provided a control apparatus for carrying out the above mentioned improved method of injecting and mold clamping. The apparatus comprises: a detector for detecting the lower free end of a parison ejected from a die at at least two spaced positions fixed in the vertical direction in the path of sag of the parison between a pair of mold halves to be moved toward each other for the mold clamping, to thereby obtain the position and time information ($I_a$, $I_b$, $I_c$, $t_a$, $t_b$, $t_c$) on the parison relative to the die and the mold; a computation device for predicting or determining the time ($t_1$) when the lower end of the parison will reach a parison position ($I_{100}$) a predetermined horizontal distance ($L_h$) away from the lower end of a mold cavity toward the lower end of the mold, and some clamping operational conditions, by a calculation based on the detected position and time information and other predetermined information, so that each inner horizontal end of the mold halves in the process of being mold clamped will approach the parison to a mold position ($St_1$) a predetermined horizontal distance ($L_h$) away from the outer face of the parison at the predicted time ($t_1$) during the injections; a command device for commanding the start of mold clamping to be effected under the determined operational conditions; and another command device for commanding the end of the injection at the predicted time ($t_1$).

The speed of sag of the parison changes according to the setting of the injection speed, the type of plastic material or resin, and the resin temperature, etc., and the die changes according to the die gap. Further, the speed of sag often changes with each shot or run. Further, the draw down phenomenon afflicts parisons. According to the present invention, the state of sag is detected with consideration also given to the draw down of the parison ejected from the die, so it is possible to obtain a direct grasp of the changing states of a sag of parisons. The state of sag of the parison is detected by two or more photoelectric sensors arranged along the vertical direction, but also may be done by electromagnetic sensors, supersonic wave sensors, etc.

When the state of sag of the parison, i.e., the dynamic locus of the free prison end, is detected by the photoelectric sensors, since the mold halves can be moved in the horizontal direction but fixed in a vertical position with respect to the direction of sag, the time when the free parison end will reach a predetermined distance away from the lower end of the mold cavity toward the lower end of the mold is easily calculated. On the other hand, the mold halves are standing by at predetermined opened positions. The distance from each opened position to the position of clamping completion or the closed position of each mold half is given as an initial value.

Further, it is set in advance, how much of a distance from the outer face of the parison the inner horizontal end of each mold half in the process of being clamped should approach the parison at the time when the lower end of the parison reaches a position a predetermined distance away from the lower end of the cavity toward the lower end of the mold. Further, an opening/closing valve and a flow adjusting valve are provided in the hydraulic path to the hydraulic cylinders of the mold machine part giving the clamping action to the mold halves, and the time of completion of the clamping is determined and the clamping stroke speed is determined by the operation of these valves. The control means engages in computation based on the time the parison reaches the predetermined distance from the lower end of the cavity toward the lower end of the mold to adjust the time of output of opening command of the opening/closing valve forward or backward, to thereby control the clamping starting time, and further, commands the opening of the flow adjusting valve so as to control the initial clamping stroke speed. Namely, it performs a control so that the mold clamping is completed quickly at all times after the free parison end passes a position that is a predetermined distance down from the lower end of the mold cavity.

Therefore, in the above constitution of the present invention, the clamping starting time and the clamping stroke speed, particularly the clamping stroke speed at an initial stage of the mold clamping, are controlled by the actual state of sag of the parison, and thus a precise mold clamping is performed even with fluctuations in the parison sag speed or state of draw down due to changes in the injection speed, resin temperature, etc., and the work of setting the mold halves becomes extremely easy. Furthermore, it is possible to prevent a reduction in yield due to an occurrence of rejected blow moldings caused by an insufficient charging of the cavity, etc. Also, it is possible to shorten the blow molding cycle time or shot time.

DESCRIPTION OF THE PREFERRED EMBODIMENTS

The method and apparatus for an injecting and mold clamping control of a blow molding machine according to the present invention will be explained in detail with reference to the drawings.

Referring to FIGS. 1A and 1B and FIGS. 3A and 3B, the blow molding machine is composed of an injection machine part (not shown) with a die 1, and a mold machine part having a mold consisting of a pair of mold halves 3 having parting faces 3C and a mold clamping device comprising hydraulic cylinder units 5. The injection machine part plasticizes a plastic material and injects it into the atmosphere through the die, so that a hollow parison 2 of the plasticized material is ejected from the die and sags downward. At a position below the die 1, there are arranged in an opposing fashion the paired mold halves 3 which sandwich therebetween the path of sag of the parison 2. These are placed so that a main portion of the parison 2 can be sandwiched in the mold cavity, which is defined in the mold halves 3, each having a cavity half 3a, when the mold is closed or clamped at the parting faces 3C.

Figures 1, 1A:
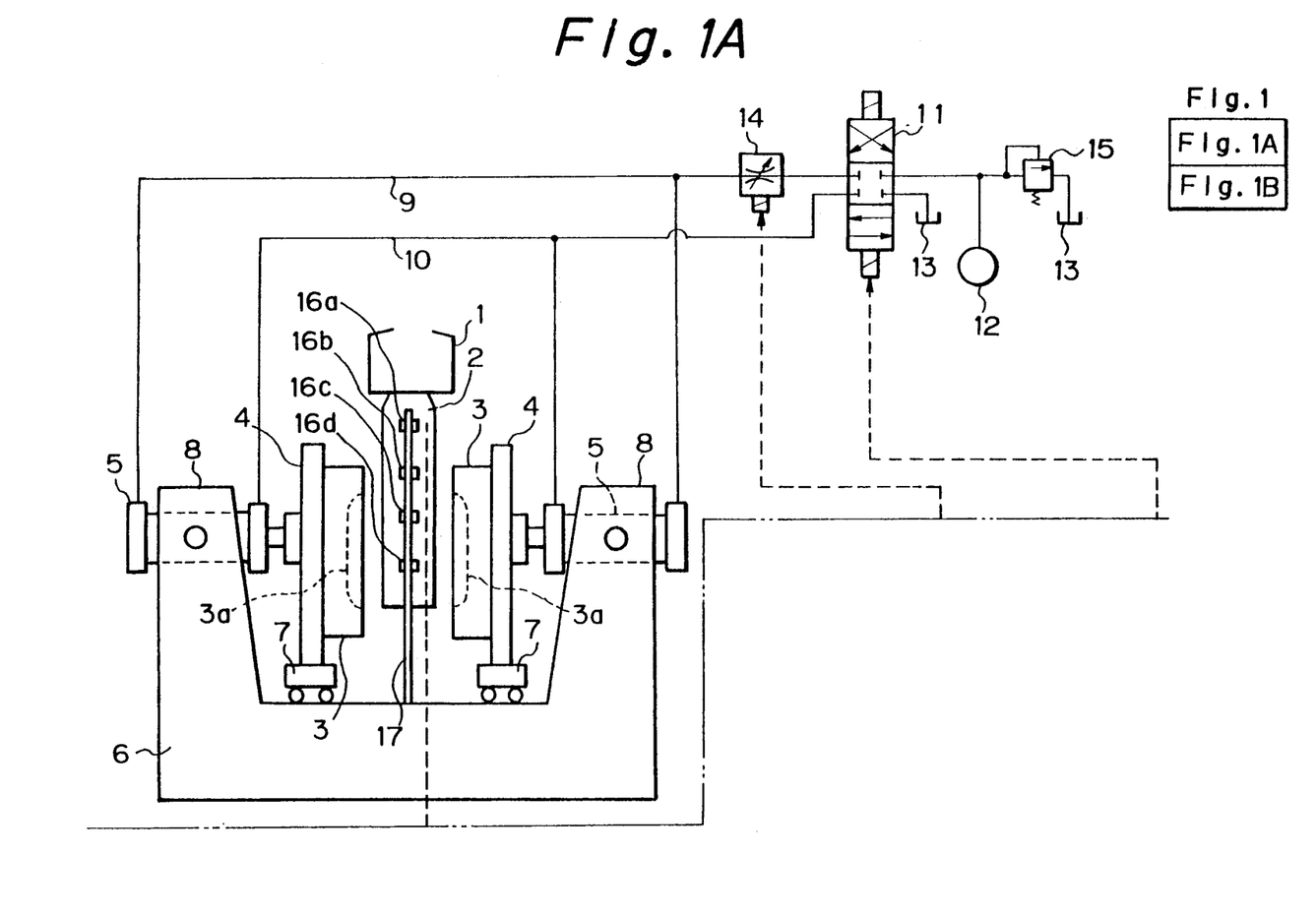
FIG. 1A and FIG. 1B are a schematic view and a diagram, respectively, in combination, showing an embodiment of an apparatus for working the method of the present invention.

The mold halves have platens 4 attached to their rear surfaces. Further the rear surfaces of the platens 4 are connected to the hydraulic cylinder units 5 for moving the mold halves 3 toward each other and apart from each other. Therefore, by supplying or exhausting pressurized oil to the hydraulic cylinder units 5, the mold halves 3 are brought close to each other to clamp the mold, or are unclamped. The direction of movement of the mold halves 3 is horizontal or orthogonal to the vertical direction of sag of the parison. For this, carts 7 running on a base 6 are attached to the platens 4. The hydraulic cylinder units 5 are supported by support frames 8 standing at the two sides of the base 6. Due to the action of the units 5, the platens 4, and in turn the mold halves 3, are moved horizontally for mold clamping or unclamping.

Figure 1B:
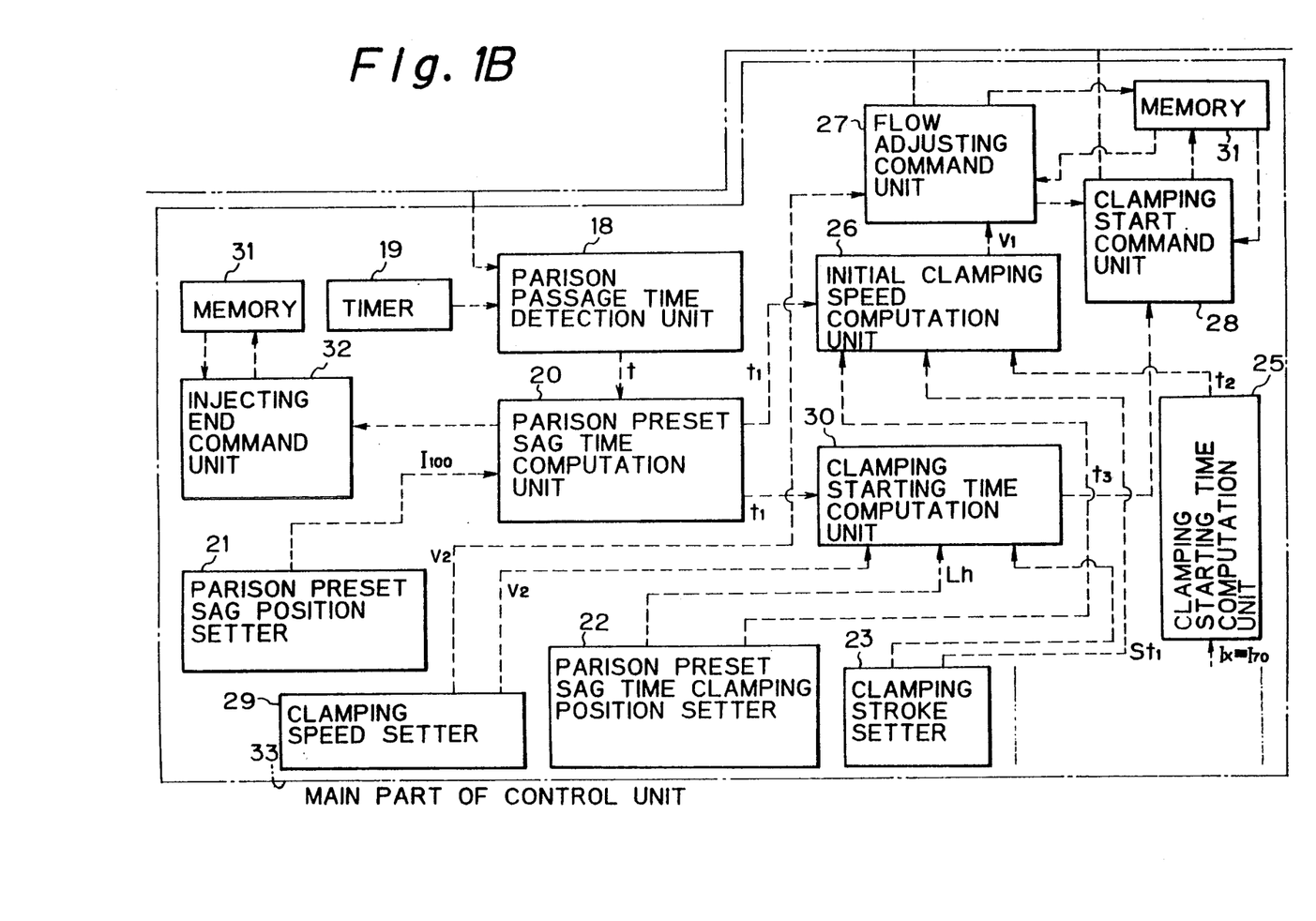

To clamp or unclamp the mold, the hydraulic cylinder units 5 are connected to a pump 12 and tank 13 through a solenoid type four-way valve 11. In a pipe 9 is provided a solenoid proportional type flow adjusting valve 14. The switching valve 11 drives the rods of the hydraulic cylinder unit 5 by a switching signal so as to switch and select among holding the position of the mold halves 3, supplying the pressurized oil to the unclamping direction, while the flow adjusting valve 14 controls the clamping stroke speed by changes in its opening. Reference numeral 15 denotes a relief valve.

In the blow molding machine, to enable suitable clamping, photoelectric sensors 16a, 16b, 16c and 16d are attached at certain heights and positions for detecting the passage of the lower free end of the parison 2 at four positions ($I_a$, $I_b$, $I_c$, $I_d$), these fixed positions being in the vertical direction in the middle of the path of sag of the parison 2. In the case of two or three fixed positions, the highest position is preferably below the upper end or top of the mold. Here, the four points are detected so as to enable, even with a draw down phenomenon, an accurate prediction of the time when the free parison end reaches a position ($I_{100}$) a predetermined vertical distance (Lv) down from the lower end of the mold cavity 3a. The sensors 16a, 16b . . . are attached to a mounting plate 17 affixed to the base 6 and are each comprised of a light emitting diode and a light receiving element arranged at opposing positions across the path of sag of the parison between the mold halves 3. Signals indicating that the free parison end has passed these positions are sent to a parison passage time detection unit 18. Reference numeral 19 denotes a timer. By starting the count simultaneously with the start of injection and sending the signals to the detection unit 18, the sensors 16a, 16b, . . . detect the time when the fixed positions are passed by the free parison end.

Figure 2:
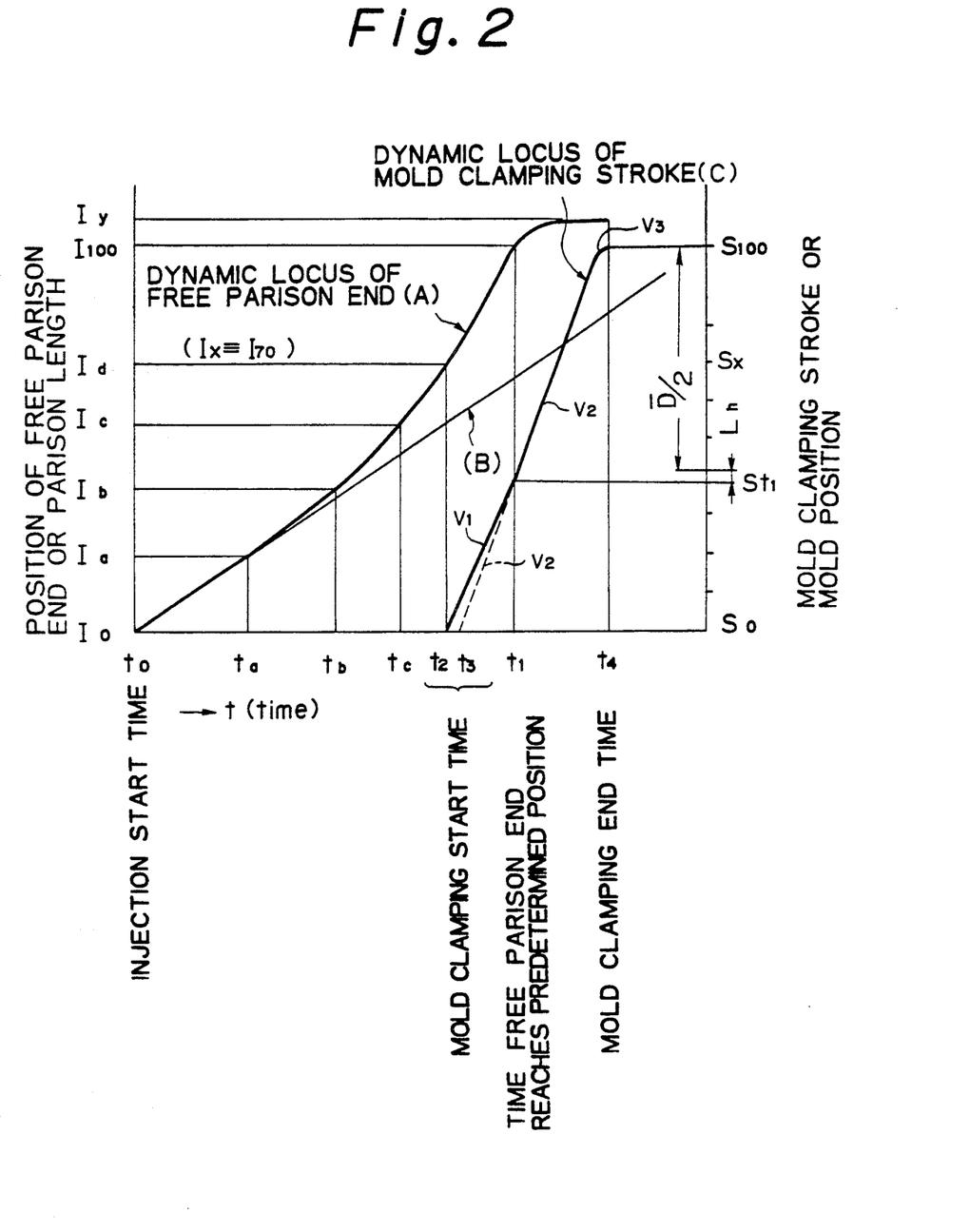
FIG. 2 is a graph showing the relationship between the state of sag of a parison and the mold clamping state in the control of the present invention.

Reference numeral 20 denotes a parison preset sag time computation unit, which performs a computation or calculation by the signals of the fixed detecting positions of the sensors set in the parison preset sag position setter 21 and the signals of the times when the free parison end passes the fixed detecting positions, as detected by the detection unit 18, so as to predict the time ($t_1$) when the free parison end reaches a position ($I_{100}$) a predetermined distance (Lv) down from the lower end of the mold cavity, for example, the time when it reaches the position of the lower end of the mold. Here, the computation is performed based on the position and time information on the parison relative to the die and the mold, obtained using the detection unit 18. The fixed positions to be detected are required to be two or more positions, because there is a draw down phenomenon occurring during the sag of the parison, and because the state of sag of the parison is such that, for example, as shown in FIG. 2, it first sags at substantially the same speed, but the free parison end begins to elongate due to the weight of the parison itself, and as a result, the distance of sag per time of the free parison end gradually becomes larger and the locus of movement becomes not linear but parabolic. Therefore, if three positions and times are detected, it is possible to find by computation the time ($t_1$) when the free parison end reaches the position ($I_{100}$) a predetermined distance (Lv) down from the lower end of the mold cavity.

Referring to FIG. 2, the vertical axis at the right shows the clamping stroke of each mold half 3 by the clamping cylinder 5 divided into 100 equal parts, and the horizontal axis shows the elapsed time (t) from the time ($t_0$) when the parison 2 begins to appear from the die 1, and shows the elapsed time (t) from the time ($t_2$) or ($t_3$) when each mold half begins to move for the mold clamping until the time ($t_4$) when the mold clamping is completed.

The left vertical axis shows the length from the outlet of the die 1 to a final position where the free parison end stops due to the end of injection. $I_0$ corresponds to a position of the die outlet where the length of the parison is zero, and $I_{100}$ corresponds to a position a predetermined distance (Lv) down from the lower end of the mold cavity. The length of the parison is divided into 100 equal parts in the left vertical axis. When the free parison end reaches $I_{100}$, i.e., at the predicted time ($t_1$), the end of injection is commanded. $I_y$ is a position, a final length of the parison which stops to elongate due to the injection end command. There is a differential length between the final position ($I_y$) and the position ($I_{100}$) corresponding to the 100% length due to the draw down phenomenon, the inertia of the plasticized material, the hydraulic operational delay occurring in the process of the end of injection commanded at the time ($t_1$), etc.

For example, assuming the $I_{100}$ corresponds to a 1 to 2 m length, the above differential length of the parison would be 50 to 100 mm.

Referring to FIG. 2, an actual dynamic locus of the free parison end is shown by the solid parabolic line A represented by a function of position and time. Note that a linear line B is the line where it is assumed that no draw down occurs. The time ($t_1$) when the free parison end reaches the position ($I_{100}$) a predetermined vertical distance (Lv) down from the lower end of the mold cavity can be found immediately by the computation unit 20 using, for example, a quadratic equation;

$I = lt^2 + mt + n$, with the detected information involving the position data of $I_a$, $I_b$, . . . and the time data of $t_a$, $t_b$, . . . and $I_{100}$.

Where n is set to 0, it is possible to find or calculate the time ($t_1$) or any other times at the position ($I_{100}$) or any other predetermined positions, using any two point data among the detected data such as: ($I_a$, $t_a$) and ($I_c$, $t_c$); ($I_b$, $t_b$) and ($I_d$, $t_d$) or the like. In order to enhance the accuracy of the calculated data, i.e., in determing a definite equation representing a dynamic path of sag of the parison, it is preferable to use at least three point data. This is because, in general, n is not negligible, since there is a time gap between the start of injection and the start of an ejection of the free parison end from the die.

Figure 3A:
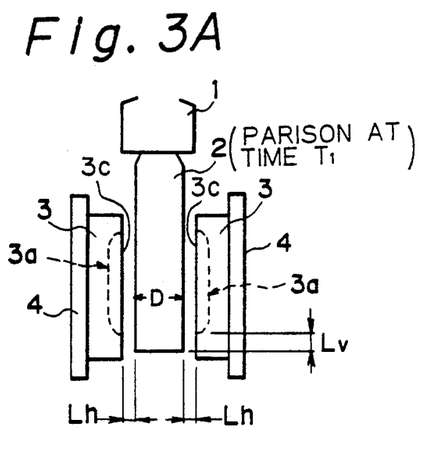
FIG. 3A and FIG. 3B are schematic views of the parisons relative to the dies and two kinds of molds, respectively.

With respect to the mold, there may be two kinds of molds. One has a pair of female mold halves 3 as shown in FIG. 3A, i.e., each defining a concave cavity half $3a$. In this case, the inner horizontal end of each mold half forms a parting face surrounding the concave cavity half, and thus the above-mentioned distance ($L_h$) is that between the parting face of each mold and the outer face of the parison.

Figure 3B:
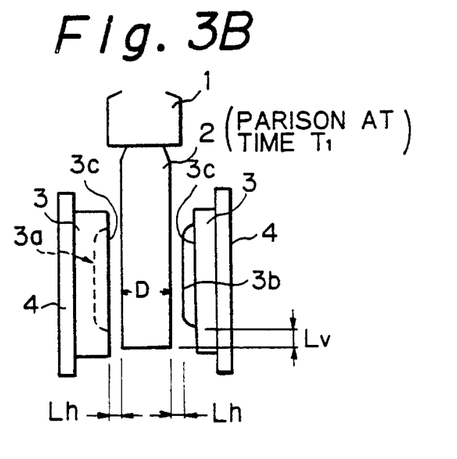

The other kind of mold has a pair of male and female mold halves 3, as shown in FIG. 3B. The male mold half defines a connex cavity half $3b$ projected inward from its parting face in the horizontal direction, while the female mold half has a concave cavity half $3a$ surrounded by its parting face. In the male mold half, the above-mentioned inner horizontal end is the inner most end of the convex cavity half, from which end the outer face of the parison is spaced the horizontal distance ($L_h$).

The horizontal distance ($L_h$) is set by a parison preset sag time clamping position setter 22, so that, at the time ($t_1$) each inner horizontal end of the mold halves 3 in the process of being mold clamped approaches the parison a mold position ($St_1$) exactly the distance ($L_h$) away from the outer face of the parison. The distance ($L_h$) is made, for example, 10 mm. The mold position ($St_1$) is determined, using the distance ($L_h$) and an average diameter ($\overline{D}/2$) or width of the parison at the position ($I_{100}$) determined by measuring in advance, i.e.,
$L_h = S_{100} - St_1 - \overline{D}/2$ A feature of the present invention is that not after the end of the injection but during the injection, the mold clamping is actuated and controlled so that, when the end of injection is commanded, i.e., at the time ($t_1$) when the free parison end reaches the predetermined position ($I_{100}$) which ensures a production of a complete hollow article, each mold half 3 approaches the position ($St_1$) a predetermined horizontal distance ($L_h$) between the inner horizontal end of the mold half and the outer face of the parison at a predetermined stroke speed ($v_1$ or $v_2$) and each mold half 3 continues to move to complete the mold clamping over the remaining stroke of $S_{100} - St_1 = \overline{D}/2 + L_h$ at the same stroke speed or an increased predetermined stroke speed. In connection with the same stroke speed ($v_2$) or different stroke speeds ($v_1$ and $v_2$), the mold clamping starting time ($t_3$ or $t_2$) is determined.

Also, assuming that the mold opening position is set not to $S_0$ but to $St_1$, and the mold clamping is started at the time ($t_1$), this case would be defective in that, when the free parison end enters into a narrow space gap between the mold halve having a distance of $2 \times (S_{100} - St_1)$, it is likely to be damaged by the mold halves. The free parison end is apt to be deformed in the initial position corresponding to the die outlet, and the deformation is apt to still remain even in a position corresponding to the top of the mold, and further, the diameter of the parison is reduced as the length of the parison is increased, due to the draw down phenomenon. In this regard, it is obvious that the mold clamping starting from the assumed opened position ($St_1$) is defective in practice.

The mold clamping method of the present invention does not damage the parison, because the mold clamping: starts at a normal opened position ($S_0$) at which a large space gap exists between the mold halves having a distance of $2 \times S_{100} = S_0$; only when the free parison end reaches a position near the lower end of the mold cavity, for example a position ($I_{70}$), i.e., 70% of the length ($I_{100}$), does the mold clamping start; and each inner horizontal end of the mold halves is allowed to approach the parison with the small space gap ($L_h$), for example, 10 mm, only when the free parison end reaches the position of $I_{100}$ and the end of injection is commanded. At the position $I_{70}$, the deformation of the free parison end has been fully remedied by the weight itself, and the diameter of the parison has been reduced, due to the draw down phenomenon, to a diameter which is close to that (D) at $I_{100}$ and is relatively stable in variation during a long repeated run of the injection and blow molding process. In this regard, the clamping starting time is preferably set to the time at which the free parison end reaches a position between $I_{70}$ and $I_{100}$.

To suitably clamp the mold, for example, as shown below, two control methods may be adopted; one is to set in advance the clamping starting time ($t_2$) and determine the initial stroke speed ($v_1$) of each mold half 3, and the other is to set the clamping stroke speed to a constant speed ($v_2$), preferably the maximum speed of the mold stroke, over substantially the entire stroke, and determine the clamping starting time ($t_3$). In the first method, the initial stroke speed ($v_1$) is changed to a following higher stroke speed, equivalent to the above stroke speed ($v_2$) in the second method, at the time ($t_1$) and held over substantially the remaining entire stroke. In both methods, the stroke speed ($v_2$) is considerably reduced to a low speed ($v_3$) at a time immediately before the opposite mold halves impinge against each other, via the parison, at their parting faces 3C, so that they are prevented from being damaged by each other, as shown by the stroke line C at the top curved portion thereof.

In the above first method involving $v_2$ and $t_3$, the predetermined distance ($L_h$) is set in the parison preset sag time clamping position setter 22, and a stroke from the clamping starting position or mold opened position ($S_o$) to the mold position ($St_1$) corresponding to the predetermined distance ($L_h$) away from the parison having an average diameter ($\overline{D}$), i.e., the mold position ($St_1$) is set in the clamping stroke setter 23. Further, a suitable parison position ($I_x$), for example, the position ($I_{70}$), is set as a position of the free parison end at the time ($t_2$) at which the mold clamping is started, in the clamping starting point setter 24. Note that $I_{70}$ corresponds to 70% of the parison length at $I_{100}$. The clamping operation is started at the time ($t_2$) when the free parison end sags 70 percent down from the die. In this case, the starting time ($t_2$) can be set by a calculation in the clamping starting time unit 25, using the above-mentioned equation with the predetermined data ($I_{70}$).

The above mentioned predetermined signals $L_h$, $St_1$ and $t_2$ (derived from $I_{70}$) are input to the initial clamping speed computation unit 26, where a computation is performed to find the initial stroke speed ($v_1$), which is to be held after the clamping is started at the time ($t_2$) and until the mold position ($St_1$) is reached. When the computation is completed, a signal corresponding to the initial stroke speed ($v_1$) is sent to the flow adjustment command unit 27. The signal output from the flow adjustment command unit 27 is sent to the flow adjusting valve 14. This valve 14 is adjusted to an opening corresponding to the desired initial clamping speed ($v_1$).

When the adjustment is completed, a clamping start command is sent from the flow adjustment command unit 27 to the clamping start command unit 28. A clamping start command signal is sent from the clamping start command unit 28 to the solenoid of the switching valve 11. The switching valve 11 is switched so as to start the mold clamping. Of course, at the initial stage of the mold clamping, the mold clamping is effected at the stroke speed ($v_1$). When the clamping stroke of each mold half reaches the position ($St_1$), the mold clamping operation is switched from the initial speed ($v_1$) to the desired clamping stroke speed ($v_2$) set in the clamping speed setter 29, for example, the maximum clamping stroke speed of the clamping cylinder 5. Note, $t_4$ in FIG. 4 is a time point of mold clamping completion.

On the other hand, in the second method where the clamping stroke speed ($v_2$) through substantially the entire clamping stroke is set at a speed, preferably the maximum stroke speed of the clamping cylinder 5, and a suitable clamping starting time ($t_3$) is determined, the present data of $L_h$ is set in the parison predetermined sag time clamping position setter 22, and $St_1$ is set in the clamping stroke setter 23, while $v_2$ is set in the clamping speed setter 29. The opening of the flow adjusting valve 14 is adjusted through the flow adjustment command unit 27 to give the maximum clamping speed ($v_2$). Signals corresponding to the above-mentioned data of $L_h$ (if $St_1$ is set, $L_h$ is not necessarily required), $St_1$ and $v_2$ are input to the clamping start time computation unit 30, where the suitable clamping starting time ($t_3$) is computed. Therefore, when the time reaches $t_3$, a signal is sent to the clamping start command unit 28, the switching valve 11 is switched, the mold clamping is started, and the mold clamping operation is performed at the maximum clamping stroke speed ($v_2$). This process is shown in FIG. 2 by the straight broken line (the initial clamping stage and straight solid line (the following clamping stage). The final clamping stage is shown by the curved solid line, where the switching valve 11 is switched so that the mold clamping operation is performed at a considerably reduced stroke speed.

In the above alternative control methods, when the time reaches $t_1$ (the time when the parison is ejected for a distance long enough to form a complete hollow article in the mold cavity), a signal is sent from the parison preset sag time computation unit 20 to the injecting end command unit 32 by which the injection machine part is actuated to stop the advancing stroke of the injection plunger.

The signal outputs from the flow adjustment command unit 27, the clamping start command unit 28 and the injecting end command unit 32 are stored in the memory 31, and can be suitably taken out for use as needed. Reference numeral 33 denotes the main portion of the control unit.

By using a computer or personal computer, it is possible to perform the above-mentioned detection, computation, and control in an extremely short time, so the explanation was given of performing a feed back control during a single cycle or run of injection blow molding in the above-mentioned embodiment, but it is of course also possible to issue the commands and perform the injecting and mold clamping control at the time of the next run. In the latter case, the lowest position at which the free parison end is detected may be preferably set at the lower end of the mold. In this case, it may be no longer necessary to predict the time ($t_1$) when the free parison end reaches the parison position of $I_{100}$ or the lower end of the mold.

According to the above mentioned embodiments an efficient blow molding becomes possible, since the injecting and mold clamping control is automatically, timely and effectively carried out.

Also, it is possible to eliminate the complicated preparatory work, improve the product yield, and perform an excellent blow molding by completing the mold clamping when the parison precisely reaches a suitable position, without having to reset the clamping timing and injection timing each time different products are shaped due to differences in blow molding conditions and the environment, differences in the resin materials, and changed molds.

Further, it is possible to precisely time the mold clamping and the end of injection, and thus prevent a blow molding failure or yield reduction even with resins with large draw downs, such as engineering plastics.

Further, since it is possible to efficiently clamp the mold at a suitable clamping timing, not after the end of injection but during the injection, the cycle time required for blow molding can be shortened, which leads to a greater efficiency.

We claim:

1. A method of controlling injection and mold clamping in a blow molding machine, the blow molding machine including an injection machine part for plasticizing a plastic material and injecting the plasticized material through a die to produce a hollow parison which sags downward from the die, the injection of the plasticized material through the die ending in accordance with a command issued to the injection machine part, and a mold machine part for blow molding the sagging parison with air to produce a hollow article defined by a mold cavity, the mold machine part including a mold having first and second mold halves having parting faces and defining the mold cavity when the mold is clamped, air blow means for blowing air into the sagging parison, and a mold clamping device for clamping the mold by moving the first and second mold halves toward each other throughout a clamping stroke such that the parting faces of the first and second mold halves abut against each other under a clamping pressure, the method comprising the steps of:

detecting a lower free end of the sagging parison at at least two spaced positions fixed in a vertical direction of a path of the sagging parison to thereby obtain position and time information;

determining a dynamic parison locus at the lower free end of the sagging parison relative to the die and the mold, the dynamic parison locus being a function of the position and time information;

determining, in accordance with the dynamic parison locus and given operational conditions, a time ($t_1$) when the free parison end reaches a parison position ($I_x$) a vertical distance ($L_y$) from a lower end of the mold cavity, and a clamping starting time ($t_3$) prior to the time ($t_1$), the times ($t_1$) and ($t_3$) occurring after commencement of the injection of the plasticized material through the die;

actuating the mold clamping device at the clamping starting time ($t_3$) to move the first and second mold halves toward each other at a clamping stroke speed ($v_2$) so that the parting faces of the first and second mold halves approach a mold position ($St_1$) a predetermined horizontal distance ($L_h$) away from an outer surface of the sagging parison at the time ($t_1$), the clamping stroke speed ($v_2$) being maintained until prior to abutment of the parting faces of the first and second mold halves; and during the actuation of the mold clamping device, issuing the command to the injection machine part at the time ($t_1$) to end the injection of the plasticized material through the die.

2. A method of controlling injection and mold clamping in a blow molding machine, the blow molding machine including an injection machine part for plasticizing a plastic material and injecting the plasticized material through a die to produce a hollow parison which sags downward from the die, the injection of the plasticized material through the die ending in accordance with a command issued to the injection machine part, and a mold machine part for blow molding the sagging parison with air to produce a hollow article defined by a mold cavity, the mold machine part including a mold having first and second mold halves having parting faces and defining the mold cavity when the mold is clamped, air blow means for blowing air into the sagging parison, and a mold clamping device for clamping the mold by moving the first and second mold halves toward each other throughout a clamping stroke such that the parting faces of the first and second mold halves abut against each other under a clamping pressure, the method comprising the steps of:

detecting a lower free end of the sagging parison at at least two spaced positions fixed in a vertical direction of a path of the sagging parison to thereby obtain position and time information;

determining a dynamic parison locus at the lower free end of the sagging parison relative to the die and the mold, the dynamic parison locus being a function of the position and time information;

determining, in accordance with the dynamic parison locus and given operational conditions, a time ($t_1$) when the free parison end reaches a parison position ($I_x$) a vertical distance ($L_v$) from a lower end of the mold cavity, and a clamping starting time ($t_2$) prior to the time ($t_1$), the times ($t_1$) and ($t_2$) occurring after commencement of the injection of the plasticized material through the die;

actuating the mold clamping device at the clamping starting time ($t_2$) to move the first and second mold halves toward each other at a clamping stroke speed ($v_1$) until the time ($t_1$) and at a clamping stroke speed ($v_2$) at the time ($t_1$) until prior to abutment of the parting faces of the first and second mold halves, the clamping stroke speed ($v_2$) being greater than the clamping stroke speed ($v_1$); and during the actuation of the mold clamping device, issuing the command to the injection machine part at the time ($t_1$) to end the injection of the plasticized material through the die.

3. The method according to claim 1 or 2, wherein the parison position ($I_x$) is at a lower end of the mold.

4. The method according to claim 3, wherein the predetermined mold position ($St_1$) is at a horizontal distance of at least 10 mm between the outer surface of the parison at the lower end of the mold and an inner horizontal end of each of the first and second mold halves.

5. The method according to claim 1 or 2, further comprising the step of reducing the clamping stroke speed ($v_2$) immediately prior to abutment of the parting faces of the first and second mold halves.

6. The method according to claim 3, wherein the lower free end of the sagging parison is detected at three spaced positions fixed in the vertical direction of the path of the sagging parison, each of the three positions being between the die and the lower end of the mold cavity and at least two of the three positions being between an upper end of the mold and the lower end of the mold cavity.

7. The method according to claim 6, further comprising the steps of determining an average diameter of width of the parison when the lower free end of the parison reaches the lower end of the mold, and using the averaged diameter or width to determine the operation conditions.

8. The method according to claim 2, wherein the clamping starting time ($t_2$) is a time which the parison sags a vertical distance of about 70 percent of a vertical distance that the parison sags at the time ($t_1$).

* * * * *